No. 826,223. PATENTED JULY 17, 1906.
C. H. BROADWELL.
MIXER.
APPLICATION FILED FEB. 5, 1906.
2 SHEETS—SHEET 1.
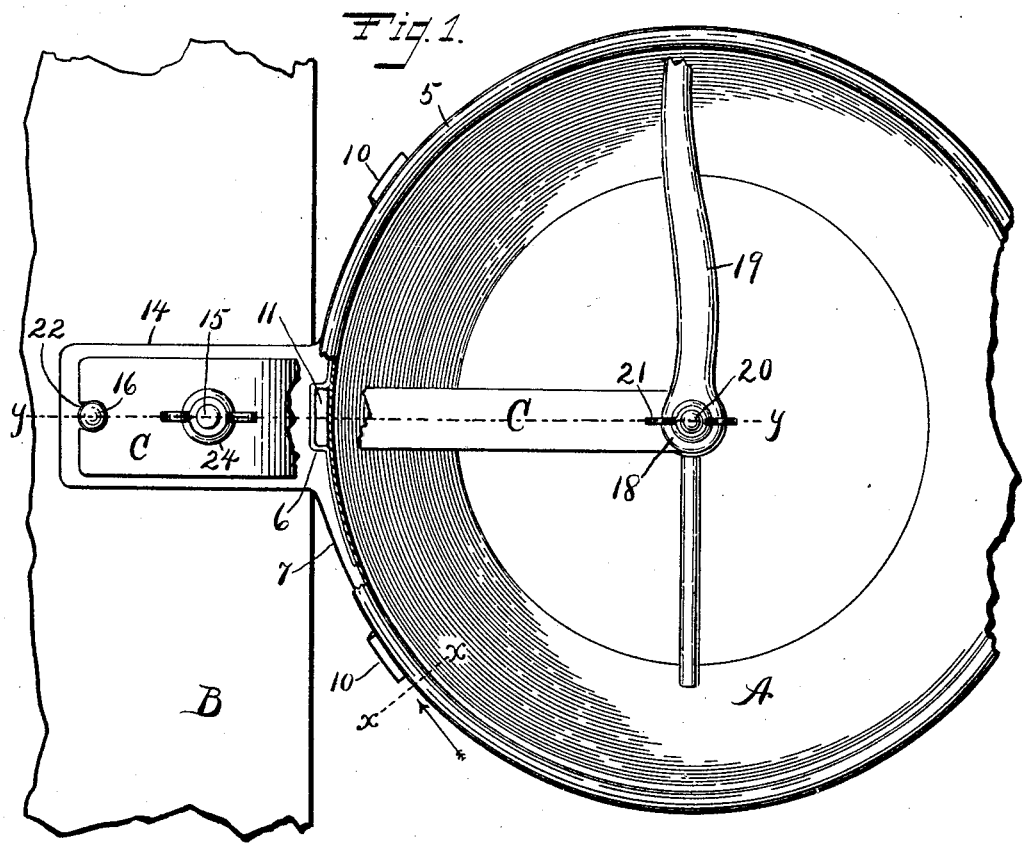
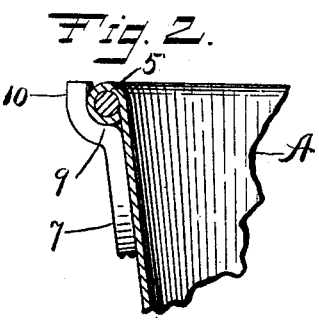
Witnesses.
S. H. Clarke
P. J. Egan
Inventor.
Charles H. Broadwell
By James Shepard
Atty.

No. 826,223. PATENTED JULY 17, 1906.
C. H. BROADWELL.
MIXER.
APPLICATION FILED FEB. 5, 1906.
2 SHEETS—SHEET 2.
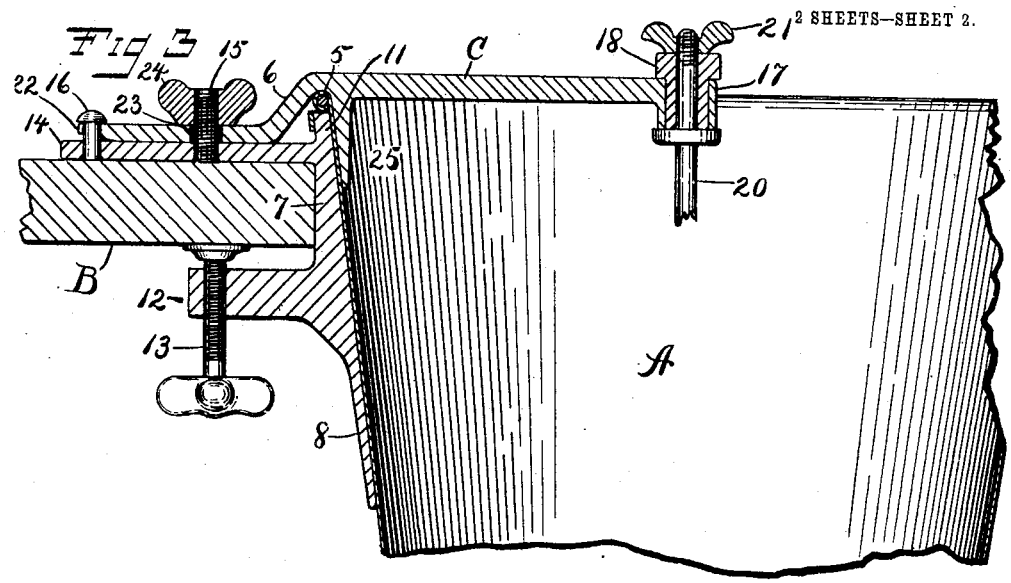
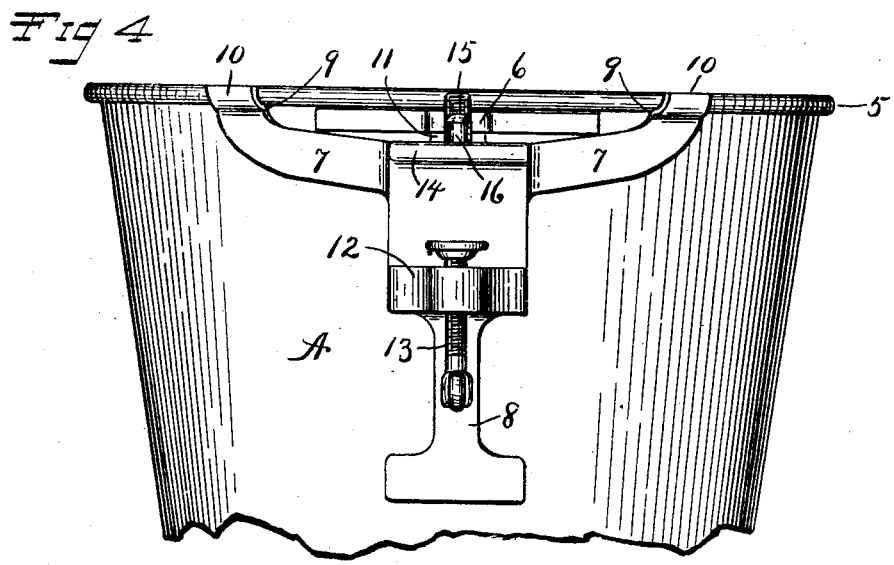
Witnesses.
S. H. Clarke.
P. J. Egan.
Inventor.
Charles H. Broadwell.
By James Shepard.
Atty.

UNITED STATES PATENT OFFICE.

CHARLES H. BROADWELL, OF NEW BRITAIN, CONNECTICUT, ASSIGNOR TO LANDERS, FRARY AND CLARK, OF NEW BRITAIN, CONNECTICUT, A CORPORATION.

MIXER.

No. 826,223.

Specification of Letters Patent.

Patented July 17, 1906.

Application filed February 5, 1906. Serial No. 299,409.

*To all whom it may concern:*

Be it known that I, CHARLES H. BROADWELL, a citizen of the United States, residing at New Britain, in the county of Hartford and State of Connecticut, have invented certain new and useful Improvements in Mixers, of which the following is a specification.

My invention relates to improvements in mixers, beaters, kneaders, and analogous machines; and the objects of my improvements are mainly to provide means for securing the vessel to a table or similar support from its side near the top, whereby it may be held in a lower position than it could be if it rested directly on the table, and to transmit the strain of the crank and its shaft to the table independently of the mixing vessel.

In the accompanying drawings, Figure 1 is a broken-out plan view of my mixer, together with a portion of a table or bench to which it is clamped. Fig. 2 is an enlarged sectional elevation of a portion thereof on the line $x\ x$ of Fig. 1. Fig. 3 is a sectional view of the mixer on the line $y\ y$ of Fig. 1 with the central parts in elevation and part of the mixer shaft and vessel broken away, the said view being on the same scale as Fig. 1. Fig. 4 is a side elevation of the upper part of the vessel with the holder applied thereto, the shaft-bearing arm being removed.

The particular form of vessel and beater herein shown is adapted for use as a bread mixer and kneader; but the invention is applicable to all kinds of mixers, beaters, agitators, kneaders, or analogous machines that employ a mixing vessel and crank-shaft for such heavy work as to require fastening the vessel to a table or other support. In all prior machines of this class known to me the bottoms of the vessels have rested upon some support to which they have been clamped, so that when a vertically-arranged crank-shaft is employed therein with the crank at the top the crank has necessarily been at a height above the table or support a distance fully equal to or in excess of the depth of the vessel.

Instead of having the bottom of the vessel rest on the table or support I secure the vessel to the table by its side near the top, whereby the depth or height of the vessel has nothing whatever to do with the height of the crank by which the mixer is operated.

A designates a mixing vessel of an ordinary from and having an ordinary construction of rim 5 at the top. At one side just under this rim 5 I secure or form a socket 6, that opens vertically downward. This is the only change of construction in an ordinary vessel that is necessary to adapt it to my improved holder. The said holder consists mainly of a horizontal arm 7, which is curved to fit the exterior of the vessel A a little below the rim 5, and a vertical arm 8, extending downwardly from the middle portion of the arm 7 to bear on the outside of the vessel. At the middle portion of the horizontal arm and upper end of the vertical arm there is a lug 11 for engaging the socket 6 on the vessel, while near each end of the horizontal arm there is a rest or seat 9, Figs. 2 and 4, for the under side of the rim 5 of the vessel to rest upon and which sustains mainly the weight of the vessel and its contents.

If desired, a lip or guard 10 may be extended upwardly above the seat 9 and outside of the rim 5 to resist the lateral strain on the vessel through the said rim instead of through the side of the vessel. This is desirable, because the rim is stiffer than the side of the vessel below the rim; but it is not essential.

In order to secure my holder or hanger to a table or bench B, the holder-arms 7 8 are formed integral with clamp arms or jaws 14 12, in the lower one of which arms there is a clamp-screw 13, all of any ordinary construction. With the holder or hanger thus secured to the table B, as shown in Figs. 1 and 3, the vessel may be firmly secured thereto by merely presenting the vessel to the holder with the socket 6 just over the lug 11, then lowering the vessel to engage the said socket and lug, and then permitting the vessel to swing downwardly on the said lug and socket until the side of the vessel engages the arms 7 and 8, as shown. No other fastening is necessary, and a vessel so hung and held on the holder may be used with any ordinary form of cross-head or shaft-bearing bar and connected parts, the said bar being attached directly to the vessel in any ordinary manner. I prefer, however, to employ a shaft-bearing bar C, that is secured to the table or bench so as to receive the strain of the crank-shaft independently of the sides of the vessel. To this end the upper arm or member 14 of the clamp is provided with a screw-threaded post 15 and headed stud 16 for detachably holding the shaft-bearing bar C. The said bar has a box or bearing 17 for the hub 18 of the crank 19, to which crank-hub the upper end of the beater-shaft 20 is secured in any ordinary or proper manner—as, for example, by a thumb-nut 21. The opposite end of this shaft-bearing bar is notched, as at 22, to receive the headed stud 16, while at the proper distance from the said end is a hole 23, Fig. 3, to receive the screw-threaded post. After engaging the said parts the bar C may be firmly secured in place by the nut 24 on the screw-threaded post. It is not necessary to have this shaft-bearing bar C bear upon the vessel in any way; but it can readily be made or fitted so as to bear upon the top of the rim 5 and, if desired, may also be provided with a finger 25 on its under side in a position to come closely to the inner side of the vessel near the top, as shown in Fig. 3, whereby a part of the strain may be taken off from the lug-and-socket connection of the vessel and holder. It is evident that a shaft-bearing bar thus secured to the table independently of the sides of the vessel will receive all the strain of the crank and connected parts without transmitting that strain through the sides of the vessel, as is the case in all mixers in which the shaft-bearing bar is attached to the top of the vessel and the vessel in turn is secured to the table.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. In a mixer, the combination of a vessel and its holder, with means for securing the said holder to a table, the said vessel and holder having the one a socket and the other a lug for engaging the said socket, the said vessel having a top rim and the said holder having a horizontal arm for engaging the side of the vessel near the rim, seats for the rim to rest upon, and a vertical arm to extend downwardly on the side of the vessel below the said rim.

2. In a mixer, the combination of a vessel and holder, having the one a vertically-open socket and the other a lug for entering the said socket, all near the upper edge of the vessel, the said vessel having a top rim and the said holder having a curved horizontal arm for engaging the side of the vessel with rim-seats near each end, and a guard-lip extended above the said rim-seats for engaging the rim by its side, a downwardly-extended arm to bear upon the side of the vessel and means for securing the holder to a table.

3. In a mixer, the combination of a vessel with a holder-arm for engaging the side of the vessel near the top, and a pair of clamp-arms extending horizontally away from the said holder-arm and from the vessel, whereby the holder may be clamped to the edge of a table and the vessel suspended from the said holder with its lower part extending below the said arms and table.

4. In a mixer, the combination of a vessel with a laterally-extended holder-arm for engaging the vessel near the top and bearing on the outer side of the vessel just below the top, a pair of clamp-arms extending horizontally away from the said holder-arm, and away from the said vessel, and a second holder-arm extending downwardly from the lower one of the said clamp-arms for engagement with the outer side of the vessel.

5. In a mixer, the combination of a vessel with a holder adapted to engage and hold the vessel from one side near its top edge, the said holder having a downwardly-extended arm for bearing on the outer side of the vessel, means for securing the holder to a table, and a shaft-bearing arm detachably secured to the said means, the said arm being extended over the top of the vessel and having a downwardly-extended finger for engaging the inner wall of the said vessel.

6. In a mixer, the combination of a vessel and its holder with means for securing the said holder to a table, the said vessel and holder having the one a socket and the other a lug for engaging the said socket, the said vessel having a top rim and the said holder having a horizontal arm for engaging the side of the vessel near the rim and seats for the rim to rest upon, and a shaft-bearing arm mounted on the said holder for supporting a crank-shaft over the top of the vessel.

7. In a mixer, the combination of a vessel, with a holder-arm for engaging the side of the vessel near the top, a pair of clamp-arms extending horizontally away from the said holder-arm and vessel for securing the said vessel to a table, and a shaft-bearing arm detachably secured to the upper member of the said pair of clamp-arms and projecting from the holder in the opposite direction from that of the said clamp-arms.

CHARLES H. BROADWELL.

Witnesses:
JAMES SHEPARD,
SHEFFIELD H. CLARKE.